United States Patent [19]

Ahrens

[11] 4,447,055
[45] May 8, 1984

[54] PLAYGROUND EQUIPMENT WITH WOODEN TIMBERS HAVING INTERNAL FASTENERS

[75] Inventor: Paul W. Ahrens, Grinnell, Iowa

[73] Assignee: Miracle Recreation Equipment Company, Grinnell, Iowa

[21] Appl. No.: 398,071

[22] Filed: Jul. 14, 1982

[51] Int. Cl.³ .......................... A63B 9/00; F16B 23/00
[52] U.S. Cl. .................................. 272/113; 411/377; 411/903; 411/911
[58] Field of Search .............. 411/338, 377, 901-903, 411/429, 911, 371-373; 272/113; 135/DIG. 9; 411/427; 109/52, 23, 78; 403/267; 52/418, 787, 790, 793

[56] References Cited

U.S. PATENT DOCUMENTS

| | | | |
|---|---|---|---|
| 1,298,308 | 3/1919 | Dodds | 411/372 |
| 2,659,952 | 11/1953 | Schlueter | 411/911 |
| 3,134,290 | 5/1964 | Jentoft | 411/377 |
| 3,969,871 | 7/1976 | Ewers | 272/113 |

FOREIGN PATENT DOCUMENTS

| | | | |
|---|---|---|---|
| 82933 | 2/1921 | Austria | 109/52 |
| 414964 | 9/1946 | Italy | 411/429 |
| 832019 | 4/1960 | United Kingdom | 411/371 |

*Primary Examiner*—Richard J. Apley
*Assistant Examiner*—Stephen R. Crow
*Attorney, Agent, or Firm*—Zarley, McKee, Thomte, Voorhees & Sease

[57] ABSTRACT

Playground equipment having wooden timbers includes a plastic fastener with a metal threaded core flushly mounted in the wooden timbers for interconnecting the wooden timbers to associated members of the playground unit. The plastic fastener has one-way tightening means and actuates the metal core by locking engagement with the metal core, thereby preventing disassembly of the playground equipment.

8 Claims, 9 Drawing Figures

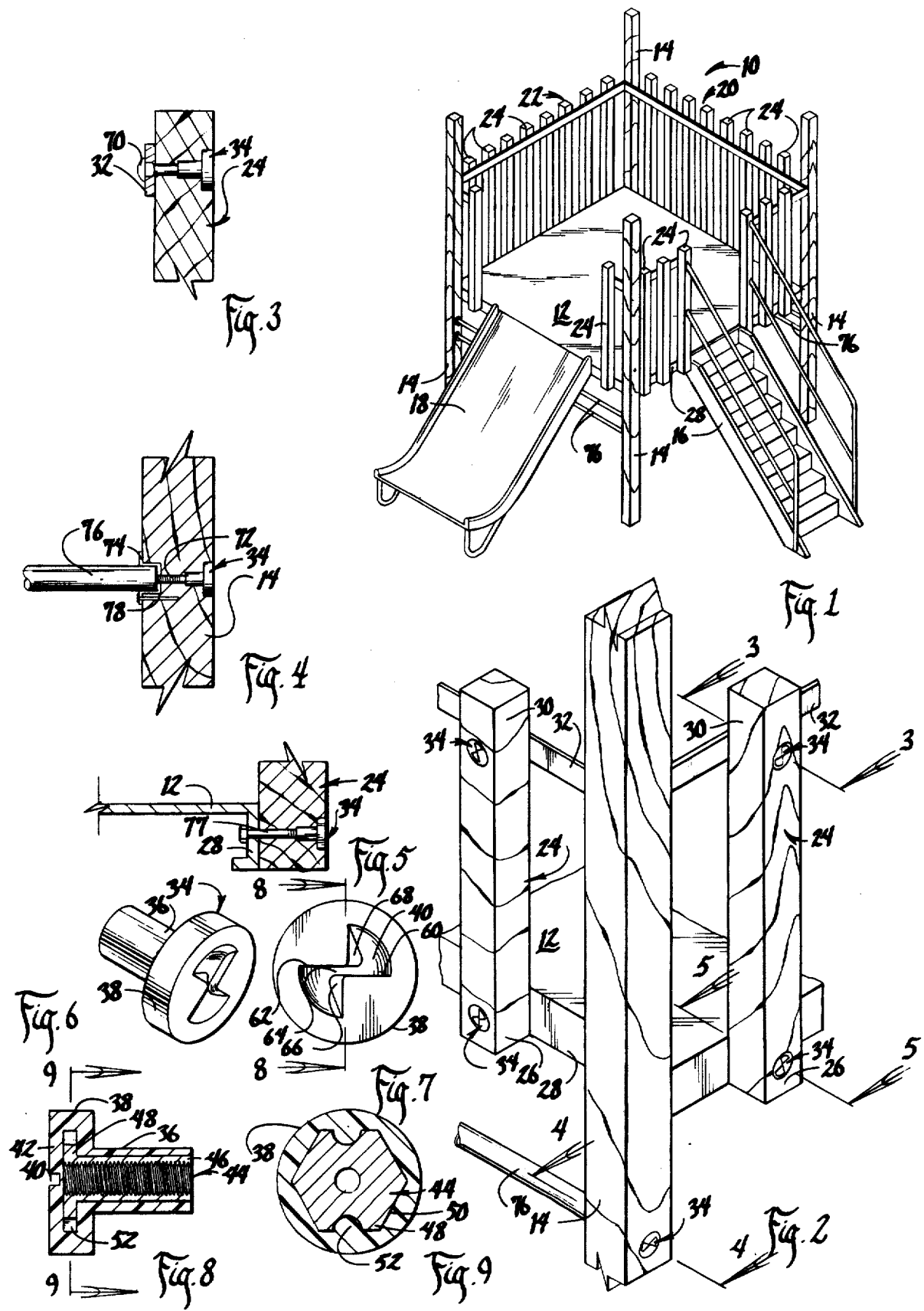

PLAYGROUND EQUIPMENT WITH WOODEN TIMBERS HAVING INTERNAL FASTENERS

BACKGROUND OF THE INVENTION

The use of wooden timbers in playground equipment presents several problems. One of the problems is that there is a temptation to disassemble the playground equipment to utilize the woooden timbers for fuel purposes.

Furthermore, wood is a natural material and the use of metal fasteners of conventional design distracts from the natural pleasing appearance of the wood members. Additionally, wood being of a softer material compared to metal results in conventional fasteners becoming loose over an extended period of use.

Safety to the users of the equipment can also be a problem. There should be no sharp exposed edges on the fasteners being used that would injure the users.

It is believed that the plastic-metal fastener of this invention overcomes at least all of these problems.

SUMMARY OF THE INVENTION

A one-piece metal fastener having an internally threaded sleeve and an enlarged washer-like head is embedded in a plastic body having a corresponding shape. The enlarged head of the plastic body includes recessed one way tool-engaging shoulders for cooperation with a screwdriver or the like. The fastener can only be tightened and thus not removed for disassembly of the unit. The outer surface of the plastic body head is flush with the outer surface of the wooden timber and the fastener head has a color corresponding to the wooden timber thus giving the appearance of being a part of the wood and obscuring its presence.

The enlarged head is sufficiently large to give ample support and prevent the fastener from becoming loose over an extended period of use.

The metal fastener includes an enlarged head which has straight side edges with one pair of oppositely disposed side edges having semicircular recesses for increasing the locking engagement with the plastic in the plastic body.

BRIEF DESCRIPTION OF THE DRAWINGS

FIG. 1 is a perspective view of a wooden timber playground unit using the fastener of this invention;

FIG. 2 is an enlarged fragmentary perspective view thereof;

FIG. 3 is a cross-sectional view taken along line 3—3 in FIG. 2;

FIG. 4 is a cross-sectional view taken along line 4—4 in FIG. 2;

FIG. 5 is a cross-sectional view taken along line 5—5 in FIG. 2;

FIG. 6 is a perspective of the fastener;

FIG. 7 is a plan view of the enlarged head thereof;

FIG. 8 is a cross-sectional view taken along line 8—8 in FIG. 7; and

FIG. 9 is a cross-sectional view taken along line 9—9 in FIG. 8.

DESCRIPTION OF THE PREFERRED EMBODIMENT

The wooden timber playground unit of this invention is referred to generally in FIG. 1 by the reference numeral 10. The playground unit 10 includes a metal platform 12 supported by wooden posts 14 at the corners thereof. A step unit 16 is provided on one side while a slide unit 18 is on an adjacent side communicating with the platform 12. Walls 20 and 22 are provided and include wooden timber pieces 24 fastened at their lower ends 26 to a downwardly extending flange 28 on the platform 12 while the upper ends 30 are secured to a metal bracket 32.

The fastening between the wooden timbers 24 and the platform 12 and bracket 32 is through use of the fastener of this invention 34 which is seen in detail in FIGS. 6–9.

The fastener 34 includes a plastic body having an elongated sleeve 36 which merges into an enlarged head 38 having a screwdriver engaging recess 40 in the outer flat surface 42.

A metal fastener 44 is embedded in the plastic body and includes an internally threaded elongated sleeve 46 which merges into a washer-like enlarged head 48. The head 48 includes a plurality of straight side edges 50 with two opposite side edges having semicircular recesses 52 for increasing the locking engagement with the plastic material of the plastic body. The metal fastener 44 can be seen to have the generally same shape as the plastic body. It is seen that substantial plastic material is provided on opposite sides of the metal fastener head 48 and thus locks the metal fastener against movement within the plastic body. Accordingly, when the plastic body is rotated through use of a screwdriver engaged in the one-way recess 40, the metal fastener will be turned with the plastic body.

The recess 40 which allows for tightening or clockwise rotation of the fasteners 34 includes shoulders 60 and 62 forming a slot 64 therebetween for reception of the blade of the screwdriver. At 90 degrees to the plane of the shoulders 60 and 62 are oppositely facing beveled shoulders 66 and 68 which when engaged by the blade of a screwdriver will reject the screwdriver preventing the fastener 34 from being turned counterclockwise for disassembling the connection and thus the fastener is substantially tamperproof.

In use it is seen that the fastener 34 in FIG. 3 is countersunk into the wooden timber 24 such that the outer face 42 of the enlarged plastic head 38 is flush with the outer face of the wooden timber 24 and thus is substantially coplaner therewith. A conventional round-headed bolt 70 extends through the bracket 32 and threadably engages the internally threaded sleeve 46 of the metal fastener 44.

In FIG. 4, the fastener 34 is seen coupled to the threaded shank 72 integral with a mounting cup 74 carried on the end of a metal tube 76. The tube 76 is further held against rotation by nails 78 driven into the wooden timber posts 14.

FIG. 5 shows fasteners 34 securing a wooden timber 24 at its lower end 26 to the downwardly extending metal flange 28 of the platform 19. A bolt 37 extends through the flange 28 and its threaded end is engaged by the threads of the internally threaded sleeve 46 of the metal fastener 44.

Thus it is seen that the fastener 34 is adaptable for mounting a variety of wooden timbers within a playground unit to provide a rigid structure, substantially tamperproof, aesthetically pleasing in appearance, and safe for injury-free use.

I claim:

1. A playground unit having wooden timbers comprising, a fastener interconnecting a wooden timber to an associated unit member, said fastener including an internal metal fastener having an internally threaded sleeve element terminating at one end in an enlarged head, said sleeve and head contained within a plastic body having a substantially corresponding shape, said plastic body including an elongated sleeve element and an enlarged head, said second head having recessed tool engaging means for operating said fastener, and said fastener being embedded in said wooden member with the outer surface of said enlarged head being substantially coplanar with the adjacent wood member outer surface thereby providing a smooth outer surface on said wood member.

2. The structure of claim 1 wherein the enlarged head of said plastic body is substantially flat and is positioned entirely inwardly of the outer surface of the wooden timber.

3. The structure of claim 2 wherein said recessed tool engaging means is one way whereby said fastener can only be tightened through operation of a cooperating tool for turning said fastener.

4. The structure of claim 1 wherein the enlarged head of said metal fastener includes a plurality of straight side edges for locking engagement within the enlarged head of said plastic body.

5. The structure of claim 4 wherein said enlarged head of said metal fastener includes a plurality of recessed straight side edges for increased bonding with the enlarged head of said plastic body.

6. The structure of claim 5 wherein said recesses includes two oppositely disposed recesses each of which are semicircular in shape.

7. The structure of claim 1 wherein said associated unit member is of metal material and a bolt fastener having a head and a threaded shank, said shank extending through said metal material into threaded engagement with said threaded sleeve of said metal fastener.

8. The structure of claim 1 wherein the outer surface of the enlarged head of said plastic body has a color corresponding to the color of the wooden timber to obscure the presence of a fastener in the wooden timber.

* * * * *